Figure 1:
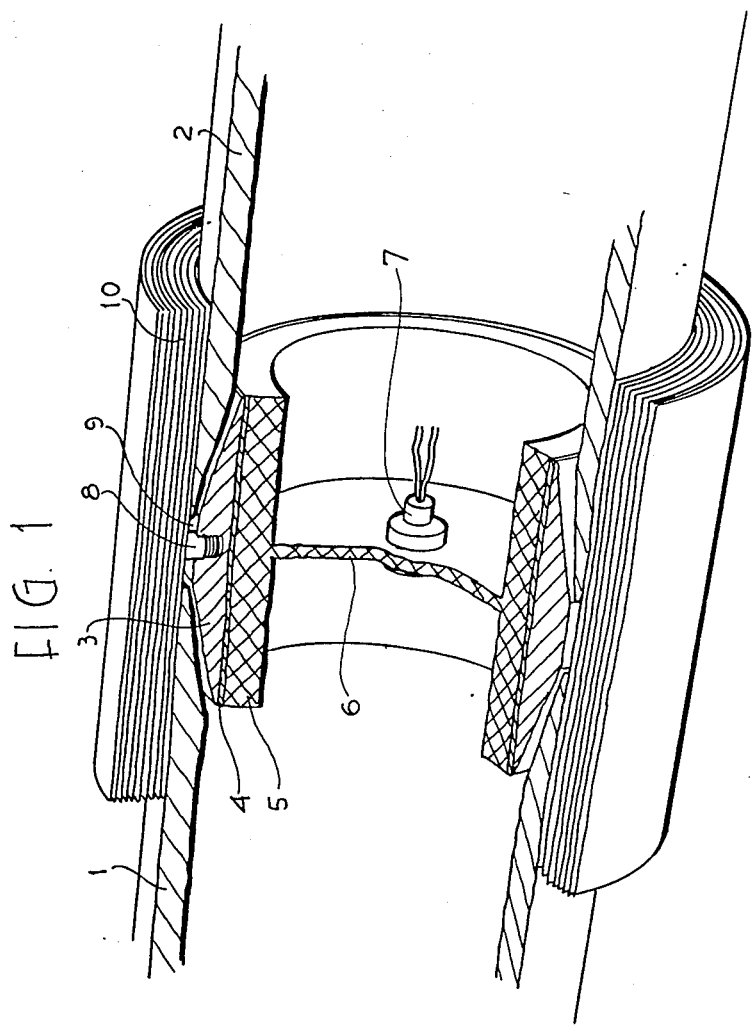

United States Patent

Persson et al.

[11] Patent Number: 4,746,150
[45] Date of Patent: May 24, 1988

[54] JOINT FOR JOINING TOGETHER TWO PIPE ENDS

[75] Inventors: Per I. Persson, Nora; Bengt Persson, Olofström, both of Sweden

[73] Assignees: Nitro Nobel AB, Gyttorp; AB Volvo, Goteborg, both of Sweden

[21] Appl. No.: 42,716

[22] Filed: Apr. 27, 1987

Related U.S. Application Data

[63] Continuation of Ser. No. 618,515, Jun. 8, 1984, abandoned.

[30] Foreign Application Priority Data

Jun. 9, 1983 [SE] Sweden .................................. 8303264

[51] Int. Cl.[4] .............................................. F16L 13/06
[52] U.S. Cl. .................................... 285/286; 285/382.4; 285/397; 285/398; 29/421 E; 228/2.5; 228/107
[58] Field of Search .................... 285/21, 286, 382.4, 285/382.5, 397, 398, 243; 29/421 E; 403/5; 415/9; 264/3.1, 3.4; 72/706, 56, 141; 76/107 R, 107 S; 102/303, 321, 314, 324; 228/2.5, 107, 108, 109, 50

[56] References Cited

U.S. PATENT DOCUMENTS

| 385,384 | 7/1888 | Thomson | 285/286 |
|---|---|---|---|
| 2,331,504 | 10/1943 | Raymond et al. | 29/446 |
| 2,337,247 | 12/1943 | Kepler | 285/286 |
| 3,068,562 | 12/1962 | Long | 29/421 |
| 3,242,306 | 3/1966 | Dollus et al. | 29/446 |
| 3,290,770 | 12/1966 | Silverman et al. | 228/107 |
| 3,343,248 | 9/1967 | Silverman et al. | 228/2.5 |
| 3,455,017 | 7/1969 | Zondag | 29/421 E |
| 3,535,767 | 8/1970 | Dohertyet et al. | 285/21 |
| 3,563,713 | 2/1971 | Rudd | 285/286 X |
| 3,602,602 | 8/1971 | Motta | 415/9 |
| 3,774,296 | 11/1973 | Clay | 285/286 X |
| 3,806,020 | 4/1974 | Howell et al. | 29/421 E |
| 4,231,506 | 11/1980 | Fstvanffy et al. | 228/109 |
| 4,555,053 | 11/1985 | Persson et al. | 228/107 |

FOREIGN PATENT DOCUMENTS

| 195947 | 1/1930 | Fed. Rep. of Germany | 285/293 |
|---|---|---|---|
| 2408801 | 9/1974 | Fed. Rep. of Germany | 403/5 |
| 1167666 | 11/1958 | France | 285/21 |
| 46585 | 4/1984 | Japan | 285/286 |
| 766741 | 1/1957 | United Kingdom | 228/205 |
| 1245415 | 9/1971 | United Kingdom | 415/9 |
| 1394819 | 5/1975 | United Kingdom | 228/107 |
| 1470379 | 4/1977 | United Kingdom | 228/107 |
| 2106817 | 4/1983 | United Kingdom | 228/107 |
| 2134203 | 8/1984 | United Kingdom | 228/2 |
| 2158908 | 11/1985 | United Kingdom | 228/107 |

Primary Examiner—Dave W. Arola
Attorney, Agent, or Firm—Dennison, Meserole, Pollack & Scheiner

[57] ABSTRACT

When joining together pipe-lines, in particular, by means of explosive welding, an outer support tool is generally used, together with an inner peripheral body (3) which is applied by means of explosives (5), to the inner surfaces of the pipes (1 and 2) to be joined. The object of the invention is to replace the support tool by a tube formed from a strip (10), said tube functioning as support during the explosive welding process and which can be removed if desired, by unwinding.

5 Claims, 2 Drawing Sheets

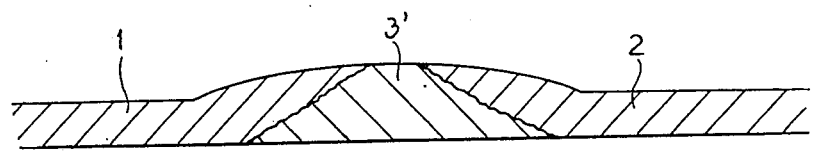
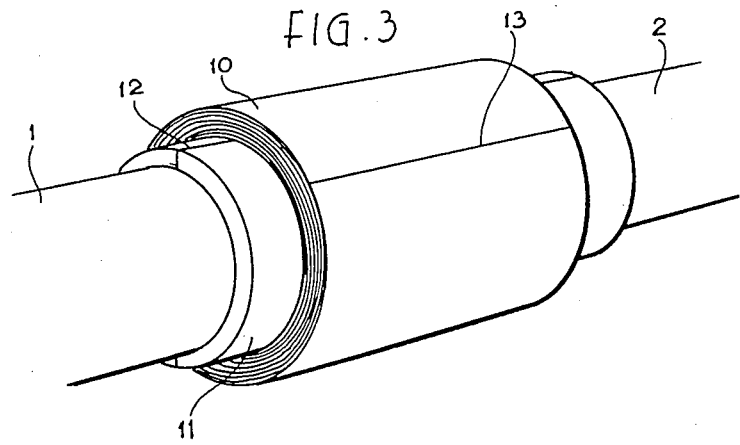
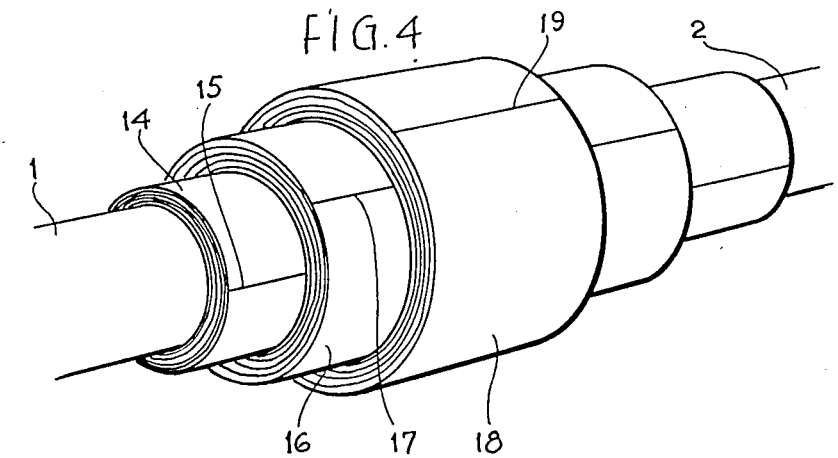

JOINT FOR JOINING TOGETHER TWO PIPE ENDS

This is a continuation of co-pending application Ser. No. 618,515 filed on June 8, 1984 and now abandoned.

The present invention relates to a joint for joining together two pipe ends. The ends of two pipes can be joined together in an infinite number of known ways. Pipes used, for instance, in district heating plants for the transport of oil and gas are normally joined by means of welding. Conventional welding has been found to have both advantages and disadvantages and explosive welding has therefore be employed with success. Explosive welding is normally performed by arranging an inner peripheral body inside the joint area and an outer peripheral body outside the joint area, the latter body functioning as a counter support. With the aid of explosives the inner peripheral body is then brought into contact with the inner surface of the two pipe ends so as to obtain an explosive weld. The outer peripheral body functions here as counter support to prevent the pipe ends from being damaged by the explosion. The drawback with the outer peripheral body is that it complicates inspection of the weld obtained. It also complicates ultrasonic checking of the weld. Any heat-treatment of the weld is also made more difficult due to the outer body. Of course, these problems can be solved by using a divided tool as counter support instead of the outer peripheral body, this tool being removed once explosive welding has been completed. However, such a tool is cumbersome, neither can it be used for differing pipe diameters.

The object of the present invention is to produce a joint in which the above drawbacks are eliminated. According to the invention this is in practice achieved by using an inner peripheral body together with explosive, the body being utilized to form an explosive weld, and an outer peripheral body designed to function as counter support and also as a mechanical joint, if desired. The outer peripheral body is in the form of a tube and is obtained by winding a metal strip a number of turns.

The metal strip preferably consists of cold-rolled steel strip.

The free end of the metal strip is preferably welded to the adjacent strip surface. The tube formed by the metal strip can be obtained by winding on a fixture or by winding directly on the outer surface of the pipe ends to be joined.

When winding strip to form a tube, the winding process can be performed so that the tube obtained has built-in pre-stressing.

Nearest to the outer surfaces of the two pipe ends to be joined, two pipe halves, suitably of metal, and preferably a few centimeters in thickness, may be applied prior to application of a tube formed from metal strip. The latter tube is then located outside the two pipe halves.

According to the invention, several tubes of metal strip can be arranged one on top of the other, the various tubes being of different lengths. However, it is preferred that the lengths decrease gradually from the inside and outwards.

If an outer peripheral body according to the invention is to be removed, this is easily done. The welds on each strip-metal body, holding the body together, are destroyed by grinding, after which the strip forming the tubular body can be simply unwound. The joint area is thus exposed and is therefore easily accessible for inspection or other measures as desired.

From the strength aspect, the removal of an outer peripheral body after explosive welding offers greater elasticity in the pipe including the joined pipe ends.

Further characteristics of the present invention are revealed in the following claims.

The present invention will be described in more detail with reference to the accompanying drawings, in which FIG. 1 shows two pipe ends with a joint according to the invention prior to initiation, FIG. 2 shows the pipe ends according to FIG. 1 with the explosive weld produced, and FIGS. 3-4 show two further embodiments of the outer peripheral body of the joint.

FIG. 1 shows two pipe ends 1 and 2 of the type of pipe used for pipelines. The pipes are of metal and bevelled at the ends. The bevel angle may be between 5° and 30°, but an angle of ca. 10° to 15° is recommended. The two pipe ends 1 and 2 are positioned a small distance, 9, apart. This space and the bevelled surfaces are covered by an inner peripheral body 3 which is tubular and of metal, e.g. of the same type as the pipe ends 1 and 2. The peripheral body 3 is substantially rectangular in cross section and is provided centrally on its outer surface with a number of radially drilled holes, each containing a spring-actuated pin 8. Inside the body 3 is a tubular explosive charge 5, its outer surface abutting the inner surface of the body 3 via a protective layer 4 which may be of plastic. The explosive charge 5 may consist of dynamite, dynamex or trinitrotoluene. Between the ends the tubular explosive charge is provided with a disc-shaped initiating charge 6 which may consist of pentyl, explosive paste or other equivalent explosive. The initiating charge is provided at its centre with a detonator 7. On the two pipe ends 1 and 2 and outside the inner peripheral body 3 is an outer peripheral body 10. The body 10 is tubular and is formed from a steel strip wound a number of turns to form said tube. The free end of the steel strip is welded to the adjacent outer surface of the steel strip. The steel strip can be wound directly on the two pipe ends 1 and 2 or on a fixture. It can be wound in such a manner as to produce inner pre-stressing. The end edges of the body 10 may be bevelled in various ways and may fulfill both practical and esthetic requirements.

The joint described functions in the following manner: The peripheral body 10 is applied on the pipe end 1. A unit containing the inner peripheral body 3 with protective layer 4 and explosive charge 5 is then inserted from the right into the peripheral body 10. Inside the body 10, the spring-actuated pins 8 will come into abutment with the inner surface of the body and the unit with the inner peripheral body 3 can be pushed to the left until the pins are in contact with or almost in contact with the righthand edge of the pipe end 1. Once this has been achieved, the pipe end 2 is inserted in the peripheral body 10. In the drawing all the parts are in their desired positions and it can be seen that, thanks to the pins 8 and the space 9, the peripheral body 3 will be correctly positioned in relation to the joint area. If the detonator 7 is now initiated, the peripheral body 3 will be brought into contact with the pipe ends 1 and 2 by detonation of the explosive charge 5, thus producing an explosive weld having the appearance shown in FIG. 2. During this detonation stage, the peripheral body 10 functions as counter support and is deformed to a certain extent. After explosive welding, therefore, the peripheral body will function as a mechanical joint, causing a certain rigidity in relation to the parts of the pipe ends outside. This rigidity may be a drawback, but it can easily be avoided by destroying the welds securing the outer ends of the metal strip forming the peripheral body 10. The metal strip can then be removed without difficulty. The explosive weld formed as described above is designated 3'.

It may sometimes be advisable to apply two pipe halves of metal a few centimeters thick over the joint area before a peripheral body of metal strip is applied. An example of this is shown in FIG. 3 where two pipe halves 11 and 12 can be seen. A tube 10 formed of metal strip is arranged outside the pipe halves, the free outer edge of the strip being secured by a weld 13 to the adjacent strip surface.

FIG. 4 shows an example of how several peripheral bodies can be arranged one on top of the other, each being formed of metal strip. The figure shows a first body 14 with securing weld 15 for the free end of the strip. Outside this body is a second peripheral body 16, with securing weld 17, and finally a third peripheral body 18 with securing weld 19.

The various bodies have been given different lengths, decreasing from the inside and outwards, and the bodies are arranged symmetrically. However, it should be obvious that any lengths are possible. Furthermore, the edges of the tubular peripheral bodies may be bevelled in various ways.

As explained above, the essential feature of the invention is that the joint uses an outer peripheral body which is not a tool and which, if desired, can be removed. The body may consist of several parts arranged one on top of the other, at least some of which must consist of a tube produced from wound strip.

We claim:

1. In a joint for joining together abutting ends of two pipes, comprising:
    an inner peripheral body to be joined to the abutted ends at the interior surface of said pipes for joining the pipes together, by explosive detonation within the pipes; and
    an annular outer peripheral body at the exterior of the abutted ends which functions as a support during the explosive detonation;
    the improvement wherein said outer peripheral body comprises a plurality of metal strips, each wound a plurality of times upon itself to form a tube having an outer surface, each said strip having an end which is part of the outer surface of a tube and is welded to the outer surface to which it is adjacent, said plurality of strips forming a plurality of tubes arranged one on top of another, each said strip having a different width, the width of the strips decreasing as the distance from the pipes increases,
    said tubes being deformed by said explosive detonation and removed subsequent to said explosive detonation by breaking said weld and unwinding said strips, to expose said abutted ends,
    and said inner peripheral body forming a joint which is coplanar with the interior surfaces of said two pipes.

2. Joint according to claim 1, wherein said outer peripheral body additionally comprises a further tube which is split longitudinally into two halves, and which is located between said pipes and said metal strips.

3. Joint according to claim 2, wherein said further tube is made of metal.

4. Joint according to claim 1, wherein said strips are prestressed.

5. Joint according to claim 1, wherein said strips are cold rolled steel strips.

* * * * *